United States Patent
Elliott et al.

(12) 
(10) Patent No.: US 6,313,597 B1
(45) Date of Patent: Nov. 6, 2001

(54) CLEANING APPARATUS AND METHOD WITH SOFT-STARTING

(75) Inventors: Patricia M. Elliott, Leeds; Howard J. Slater, Harrogate, both of (GB)

(73) Assignee: Switched Reluctance Drives Limited, Harrogate (GB)

(*) Notice: Subject to any disclaimer, the term of this patent is extended or adjusted under 35 U.S.C. 154(b) by 0 days.

(21) Appl. No.: 09/339,095

(22) Filed: Jun. 23, 1999

(30) Foreign Application Priority Data

Jul. 2, 1998 (GB) .................................... 9814373

(51) Int. Cl.⁷ .................... H02P 1/04; H02P 7/05
(52) U.S. Cl. .................... 318/701; 318/431; 318/254
(58) Field of Search .................... 318/254, 701, 318/430, 431, 432, 433; 15/3, 300.1, 319

(56) References Cited

U.S. PATENT DOCUMENTS

| | | |
|---|---|---|
| 4,015,178 | 3/1977 | Phillot et al. |
| 4,099,291 | 7/1978 | Bowerman. |
| 4,600,873 * | 7/1986 | Roesel, Jr. et al. ............... 318/701 |
| 4,616,165 * | 10/1986 | Compter ............... 318/701 |
| 4,992,718 | 2/1991 | Kumaki. |
| 5,153,489 | 10/1992 | Unsworth et al. ............... 318/490 |
| 5,243,732 * | 9/1993 | Koharagi et al. ............... 15/319 |
| 5,406,186 | 4/1995 | Fair ............... 318/798 |
| 5,664,282 * | 9/1997 | Castwall et al. ............... 15/319 |
| 5,703,456 * | 12/1997 | Cox ............... 318/701 |

FOREIGN PATENT DOCUMENTS

| | | |
|---|---|---|
| 0 573 198 A1 | 12/1993 | (EP). |
| 94/19863 | 9/1994 | (WO). |

OTHER PUBLICATIONS

"The Characteristics, Design and Applications of Switched Reluctance Motors and Drives", by Dr. J.M. Stephenson et al., PCIM '93 Conference and Exhibition, Seminar 5, Nurnberg, Germany, Jun. 21–24, 1993, pp. 1–68.

Patent Abstracts of Japan, vol. 016, No. 347 (E–1240), Jul. 27 1992, Abstract of JP 4–105579.

* cited by examiner

*Primary Examiner*—Bentsu Ro
(74) *Attorney, Agent, or Firm*—Dicke, Billig & Czaja, P.A.

(57) ABSTRACT

A floor cleaning apparatus driven by a switched reluctance drive that is soft-started to substantially avoid any transient torque reaction disturbing the body of the cleaner. The soft-start is produced by profiling the current demand for the drive system as a function of the rotor speed. Profiling is typically done with a continuous function, a series of steps or a pair of values. Related methods provide similar advantages.

23 Claims, 4 Drawing Sheets

CLEANING APPARATUS AND METHOD WITH SOFT-STARTING

BACKGROUND OF THE INVENTION

1. Field of the Invention

This invention relates to vacuum and floor cleaners that are controlled by electronic controllers. In particular, it relates to such cleaners where the speed of the appliance is controlled during a starting period.

2. Description of Related Art

Vacuum cleaners largely fall into two broad categories. Firstly, those in which the whole cleaner is moved across the surface to be cleaned: such cleaners are normally referred to as "upright" cleaners. Secondly, those in which the main body of the cleaner is connected by a flexible hose to a cleaning nozzle that is moved across the surface to be cleaned: such cleaners are normally classed as "cylinder" cleaners. A variant of this second category has a centrally located, static body and a system of ducts and hoses to provide local cleaning. In each case, cleaning action is in part provided by suction that is produced by a fan unit driven by an electric motor.

Traditionally, the electric motor used in vacuum cleaners is a series-commutated motor with a wound armature and either an energizable winding or a permanent magnetic field. Such motors are well documented in the art, e.g. in "Electric Motors and Drives", Hughes, Heinemann Newnes, 1980, which is incorporated herein by reference. A typical torque vs speed characteristic of this type of motor is shown in FIG. 1, from which it can be seen that the torque is relatively high when the motor is initially connected to the supply and falls off as the speed rises. A typical torque vs speed curve for a vacuum cleaner fan is also shown in FIG. 1, showing that the load presented by the fan is low at low speed but rises rapidly with speed. The difference between the two curves represents the accelerating torque that is available at any speed to accelerate the load. Hence, it follows that the fan will accelerate rapidly when the motor is initially connected to the supply but that the acceleration will fall as the curves come together and the motor will run stably at the speed where the curves cross.

Because the accelerating torque is high at standstill, and because there is a significant inertia associated with the rotor of the motor and the fan unit, there is considerable torque reaction at start-up. While this is not so much a problem with upright cleaners (because the mechanical layout is generally such as to cope reasonably well with the reaction torque), it is more troublesome in cylinder cleaners since the torque reaction causes the body of the cleaner to rock sharply as the motor starts. This can be at least a cause for user annoyance or even a source of danger to the user if the cleaner rolls over. With increasing suction requirements in cleaners, and hence more powerful motors, this is becoming a greater problem.

Similar problems occur in rotary floor cleaners where a rotating brush or mop is used to clean or polish a floor surface. The transient torque reaction produced can be annoying or even dangerous for the user because the machine can swing out of control when it is started.

Rudimentary forms of speed control for cleaning appliances have been available for many years and generally take the form of thyristors or triacs which are used to phase control the alternating supply voltage over a limited range. Typically these will allow the user to reduce the speed from 100% to some lower level, e.g. 70%. However, because of the inherent high starting torque of the motor, these forms of speed control are not particularly effective in controlling the starting transient.

One solution adopted for rotary floor cleaners has been to replace the series motor with a 3-phase induction motor driven by an inverter, e.g. as described by Kumaki in U.S. Pat. No. 4,992,718, which is incorporated herein by reference. In order to avoid a high starting current being drawn, Kumaki proposes a complex method to reduce the starting current for a given period of time using a microprocessor. While this proposal for reducing the starting current will have the incidental effect of reducing the starting torque, the system has no way to measure the speed and therefore no control over the speed at which the torque of the motor is varied.

There is therefore a need for a simple system capable of starting a floor cleaning appliance so that the transient torque is reduced to an acceptable level over the speed range from standstill to the working speed.

SUMMARY OF THE INVENTION

According to the present invention, there is provided a floor cleaning apparatus comprising cleaning means, a switched reluctance drive having a rotor for driving the cleaning means, a controller for controlling energization of the drive and means for determining rotor speed of the drive and feeding a signal indicative of the rotor speed to the controller, wherein when the apparatus is switched on initially the controller is operable to vary the energization of the drive as a function of the measured rotor speed from a first value to a second higher value, thereby to control the torque produced by the motor during start up.

The controller may be operable to vary the energization smoothly from the first value to the second. For example, the controller may be operable to vary the energization level according to the following relationship:

$$E = a\omega^n + b$$

where E is the demanded energization level, $\omega$ is the rotor speed, a is an empirical constant, n is an index describing the shape of the torque curve of the fan, and b is a constant representing the required value of energization level at zero speed.

The controller may be operable to vary the energization in steps between the first value and the second value. The steps are preferably stored in a look-up table.

The energization level of the drive may vary from the first level to the operating level in a single step. In order to achieve this, the controller may comprise a first resistor connected to a reference voltage, a second resistor connected to the first resistor, a third resistor connected to the second resistor and another voltage, a microprocessor connected between the second and third resistors and an output between the first and second resistors for supplying a control signal to the drive, the microprocessor being operable to set its output impedance to substantially zero when the apparatus is switched on and subsequently set its output impedance to a high value when the rotor speed reaches a predetermined value. In this way, when the microprocessor has its impedance set to substantially zero, the controller provides a relatively low level of control signal at said output and so produces said first value of energization, and when microprocessor impedance is set to the high value, a control signal sufficient to produce the second value of energization of the drive is provided.

Preferably the controller is operable to vary the energization level by varying current demand of the drive.

Preferably, the apparatus is a vacuum cleaner. Typically, the cleaning means comprises a fan for creating suction and means operably connected to the fan for removing debris from a surface being cleaned. Alternatively, the apparatus may be a floor polisher. Typically, the cleaning means comprises a polishing pad or a brush head or a mop head.

According to another aspect of the invention, there is provided a method of operating a floor cleaning apparatus having cleaning means driven by a switched reluctance drive having a rotor operably connected with the cleaning means, the method comprising: supplying the drive with a first energization level to drive the apparatus at a first speed when the apparatus is switched on, measuring the speed of the rotor, and increasing the energization level supplied to the drive as a function of the measured rotor speed.

The energization level may be varied smoothly as a function of the measured rotor speed. The energization level may be increased according to the following relationship:

$$E = a\omega^n + b$$

where E is the demanded energization level, $\omega$ is the rotor speed, a is an empirical constant, n is an index describing the torque curve of the fan, and b is a constant representing the required value of energization level at zero speed.

The method may involve increasing the energization level in steps. This may comprise reading from a look-up table containing information on the energization level as a function of rotor speed. The energization level may be increased in a single step from its initial value to that required for driving the apparatus at its full operating speed. Preferably the energization level is varied by varying the current demand of the drive.

BRIEF DESCRIPTION OF THE DRAWINGS

Various embodiments of the invention and appliances in which the invention is embodied will now be described by way of example and with reference to the accompanying drawings in which.

DETAILED DESCRIPTION OF PREFERRED EMBODIMENTS

Figure 2:
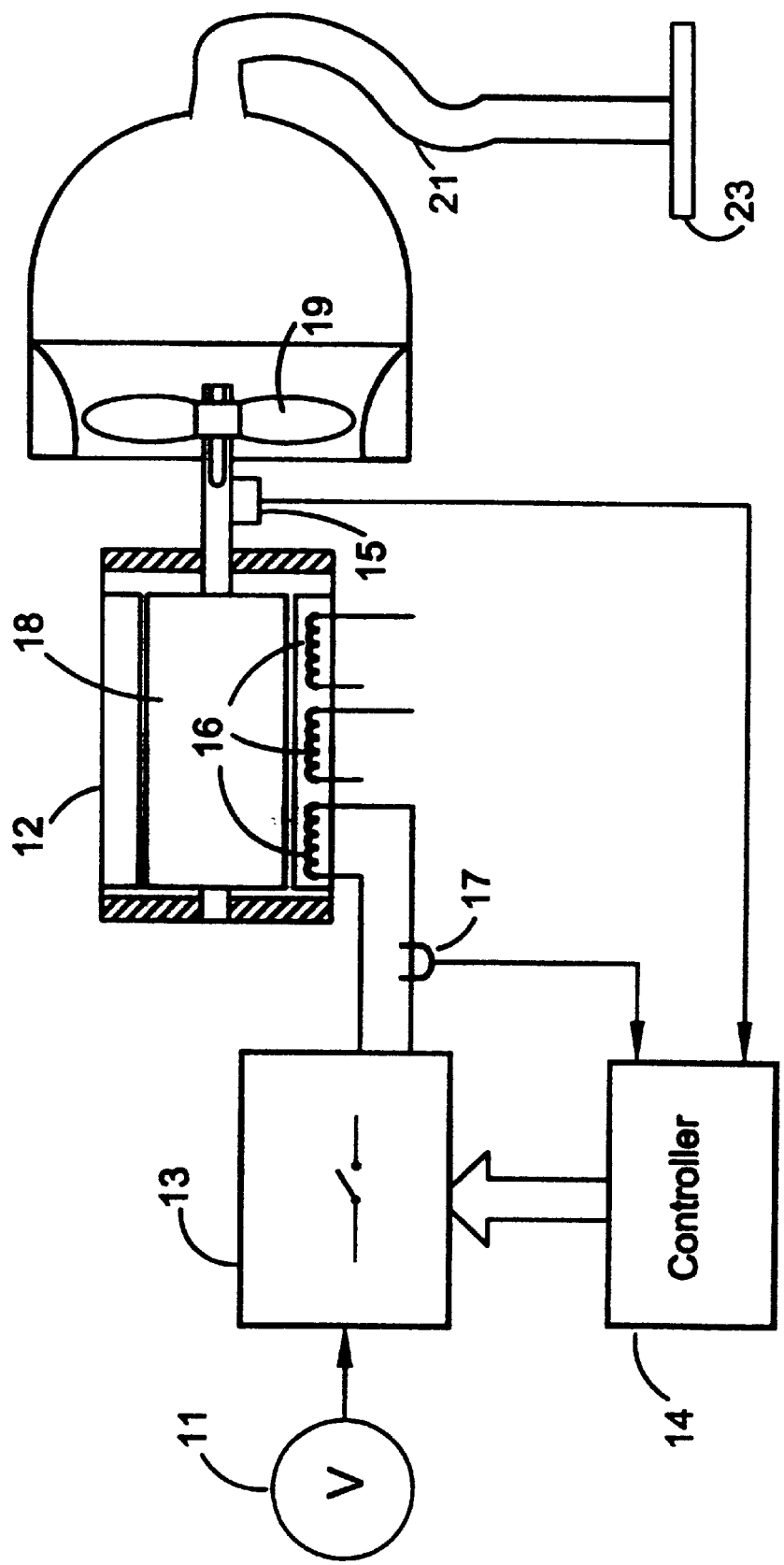
FIG. 2 shows a schematic diagram of a vacuum cleaner having a switched reluctance drive coupled to a fan unit.

FIG. 2 shows, in schematic form, a vacuum cleaner fan unit 19 driven by the rotor 18 of a switched reluctance motor 12. Connected to the fan unit is a flexible hose 21 with a cleaning nozzle 23 at its end. In use, the cleaning nozzle 23 is moved across the surface to be cleaned.

The motor 12 is powered by a DC power supply 11 that can be either a battery or rectified and filtered AC mains. The DC voltage provided by the power supply 11 is switched across the phase windings 16 of the motor 12 by a power converter 13 under the control of the electronic control unit 14. For proper operation of the drive, the switching must be correctly synchronized to the angle of rotation of the rotor. A rotor position detector 15 is typically employed to supply signals corresponding to the angular position of the rotor. The output of the rotor position detector 15 may also be used to generate a speed feedback signal.

The rotor position detector 15 may take many forms. For example it may take the form of hardware, as shown schematically in FIG. 2, or of a software algorithm that calculates the position from other monitored parameters of the drive system, as described in European Patent Application No. 0573198 (Ray), which is incorporated herein by reference. In some systems, the rotor position detector 15 can comprise a rotor position transducer that provides output signals that change state each time the rotor rotates to a position where a different switching arrangement of the devices in the power converter 13 is required.

The energization of the phase windings in a switched reluctance machine depends not only on detection of the angular position of the rotor but also on the level of current demanded in the phase winding during the conduction period.

Typically, one or more current sensors sense the actual phase winding current and feed that information back to the electronic controller. This is shown schematically in FIG. 2 by current sensor 17 sensing the current in a phase winding 16 and supplying the information to the electronic controller 14. The actual phase current, as determined by the current sensor, can then be compared with a desired phase current and the appropriate control action can be taken by the controller 14 to operate the switches in the power converter 13. In some drives, the current demand, and hence energization level, will be constant over the excitation period; in others, the current demand will be adjusted during a conduction period (so-called "current profiling"). In both cases, the level of current demanded is used as a measure of the torque being developed by the motor. The voltage applied to the windings is switched on and off to achieve the desired current level. The characteristics and operation of switched reluctance machines are well known in the art and are described in, for example, "The Characteristics, Design and Application of Switched Reluctance Motors and Drives" by Stephenson and Blake, PCIM '93, Nürnberg, Jun. 21–24, 1993, incorporated herein by reference.

Figure 1:
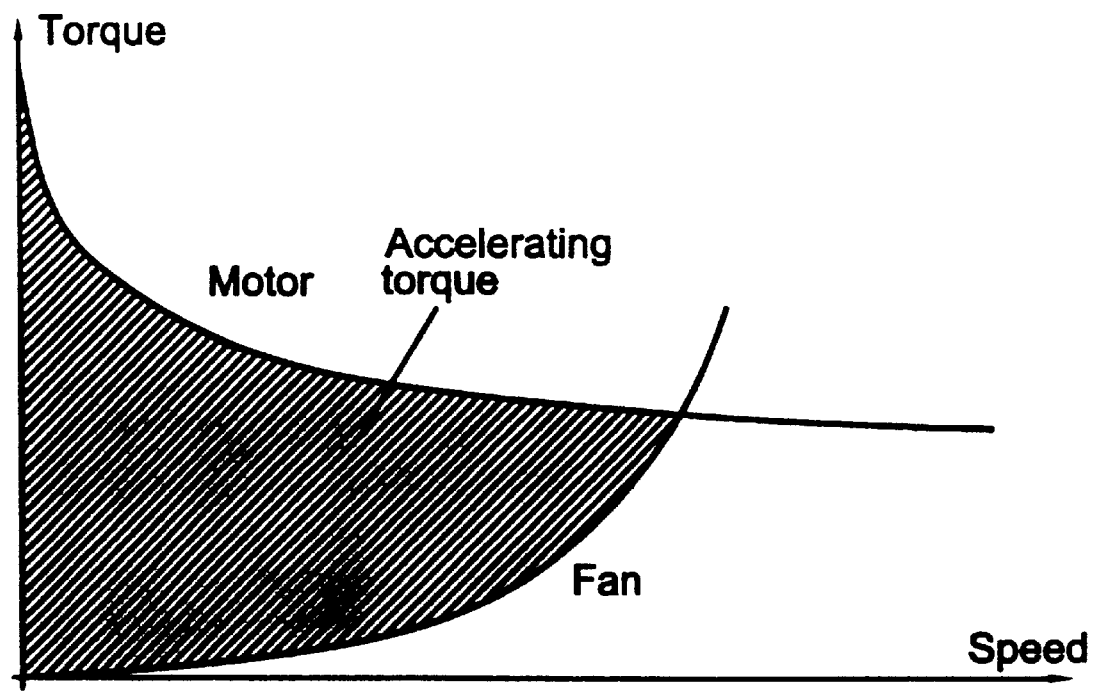
FIG. 1 shows typical torque vs speed curves for a series commutator motor and for a vacuum cleaner fan unit.
Figure 3:
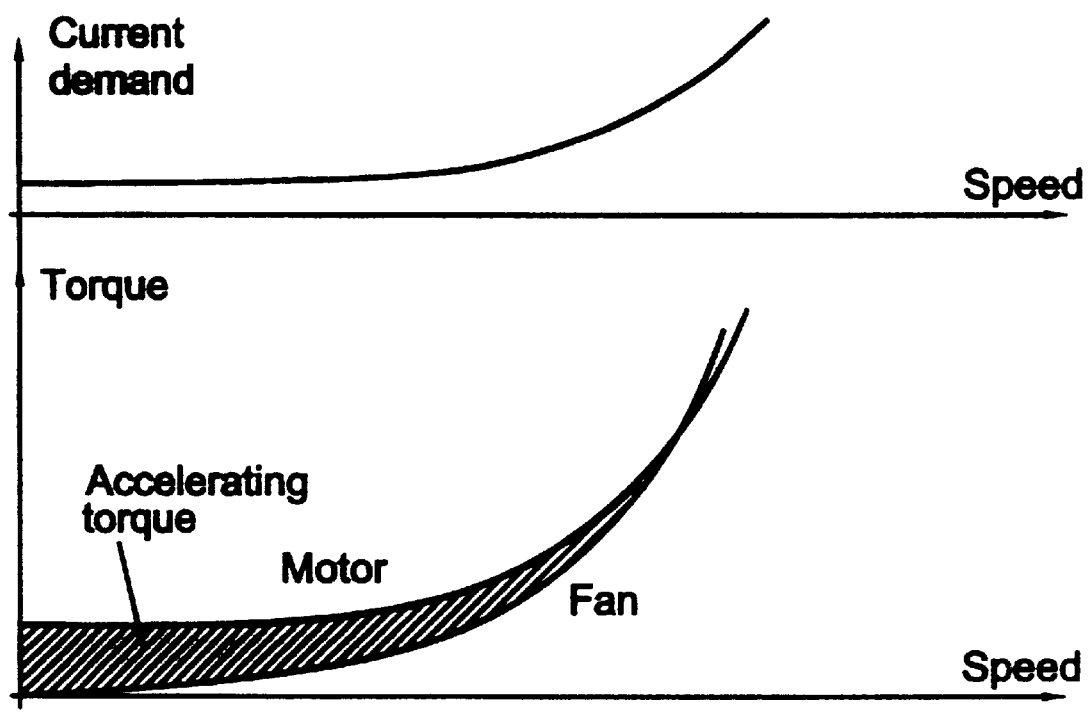
FIG. 3 shows a torque vs speed curve and a current demand vs speed curve for a switched reluctance drive for use in a floor cleaning apparatus in which the invention is embodied.

Whether or not current profiling is used over a conduction period, it is typically the case that the maximum value of the current demand is kept constant as the speed of the drive increases from zero to full load. This would give rise to a large accelerating torque at low speed and consequently a large transient torque reaction on the body of the cleaner. The inventors have recognized that by modifying the current demand as a function of speed, the accelerating torque can be reduced to a controlled amount over the speed range up to full load. This is shown in FIG. 3, where the current demand has been set so that only a small torque is available at low speed and the accelerating torque is kept at a level which will give more gradual acceleration of the fan to its working speed. This has the benefit of reducing stress on the motor, reducing the reaction torque on the cleaner body, reducing transient stresses on the fan unit itself, and possibly reducing the rating of the power switches. The more gradual the acceleration is, the greater these benefits will be. Eventually, there is a point at which a trade-off is reached with the reduced speed of response of the motor to a start-up command.

Since the switched reluctance drive operates by continuously monitoring the position (and hence the speed) of the rotor, various methods are available for making the current demand, and hence the applied voltage and developed torque, dependent on speed. The appropriate values can be calculated in real time using a simple algorithm, say of the form $$I_d = a\omega^n + b \quad (1)$$

where:
- $I_d$ is the current demand
- $\omega$ is the rotor speed
- n is an index related to the torque curve of the fan and the saturation level of the magnetic circuits of the motor, typically around 2
- a is an empirical constant
- b is a constant representing the required value of current at zero speed.

A relationship of this general form will give a smooth change in current demand, and so torque, with rotor speed.

Figure 4:
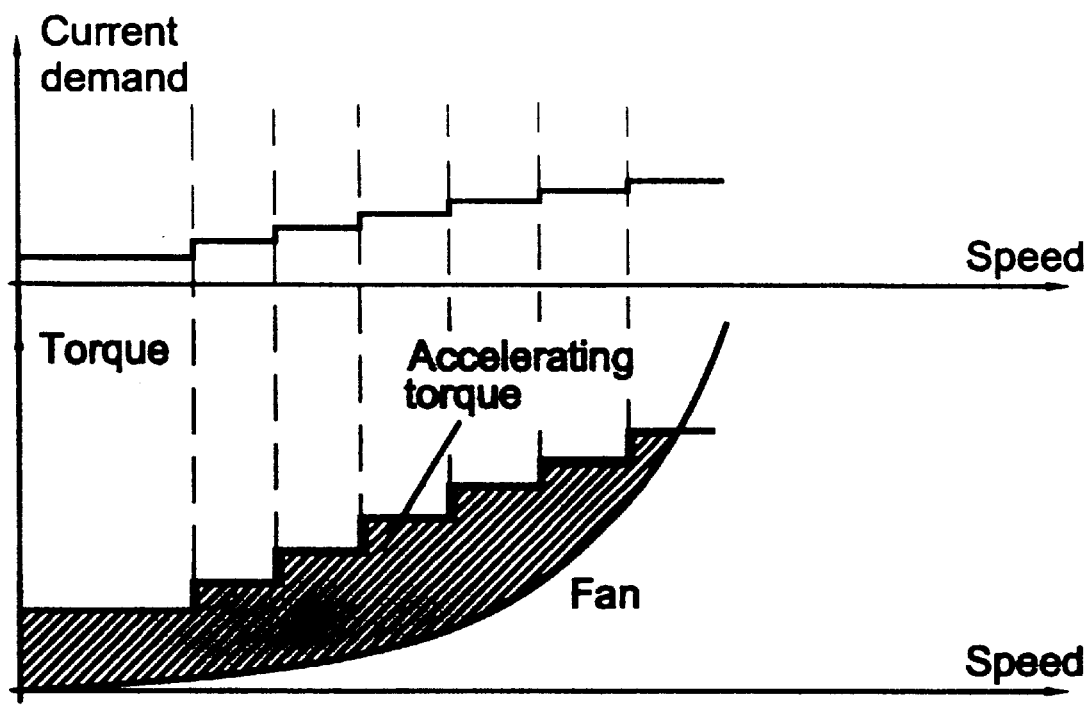
FIG. 4 shows a torque vs speed curve and a current demand vs speed curve for another switched reluctance drive for use in a floor cleaning apparatus in which the invention is embodied.

Depending on the ability of the cleaner to resist the transient torque reaction without tipping over or displaying other unwanted characteristics, it will be possible to approximate to the smooth curve of current demand by a series of steps. FIG. 4 shows such a series of steps. The values of current demand, and the rotor speeds at which they change, can be stored in a simple look-up table and accessed by using the measured rotor speed as a parameter.

Figure 5:
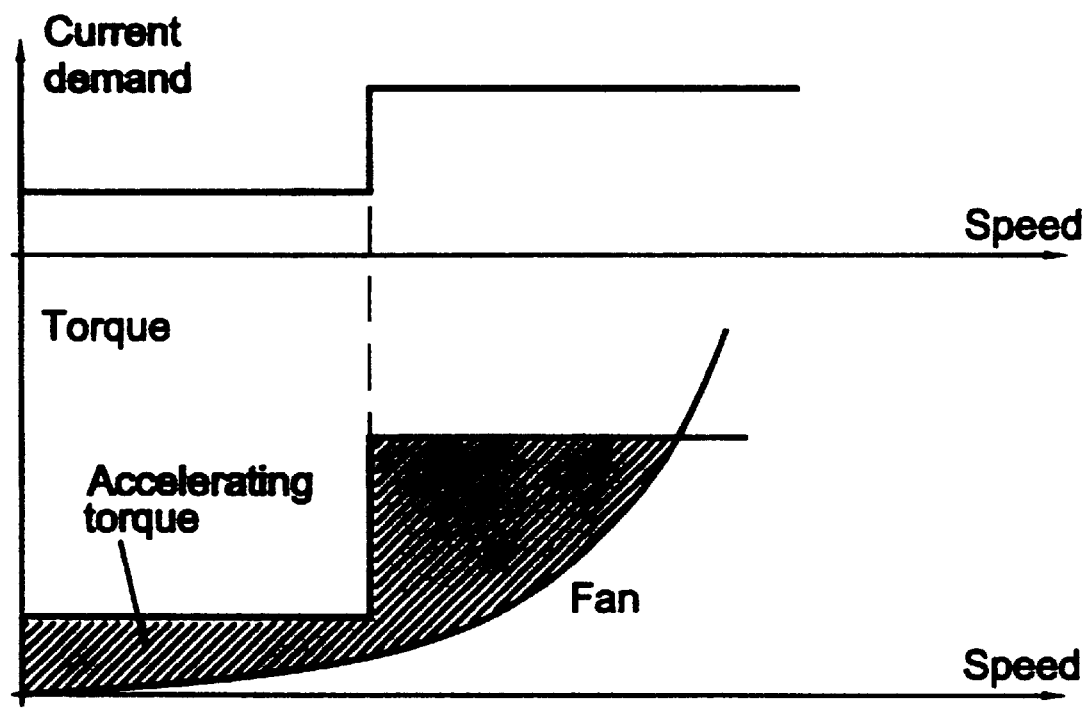
FIG. 5 shows a torque vs speed curve and a current demand vs speed curve for yet another switched reluctance drive for use in a floor cleaning apparatus in which the invention is embodied.

In some applications, especially where cost is important, the series of steps can be reduced to two values, as shown in FIG. 5. The current demand can again be stored as a function of speed in a look-up table, or, in a particularly cost-effective embodiment, can be produced as described below.

It should be noted in FIGS. 4 and 5 that, for the sake of simplicity, the diagrams have been drawn on the basis that constant current demand will produce constant torque. Those skilled in the art will recognize this as a commonly used simplification of the more complex relationship that exists in practical machines.

Figure 6:
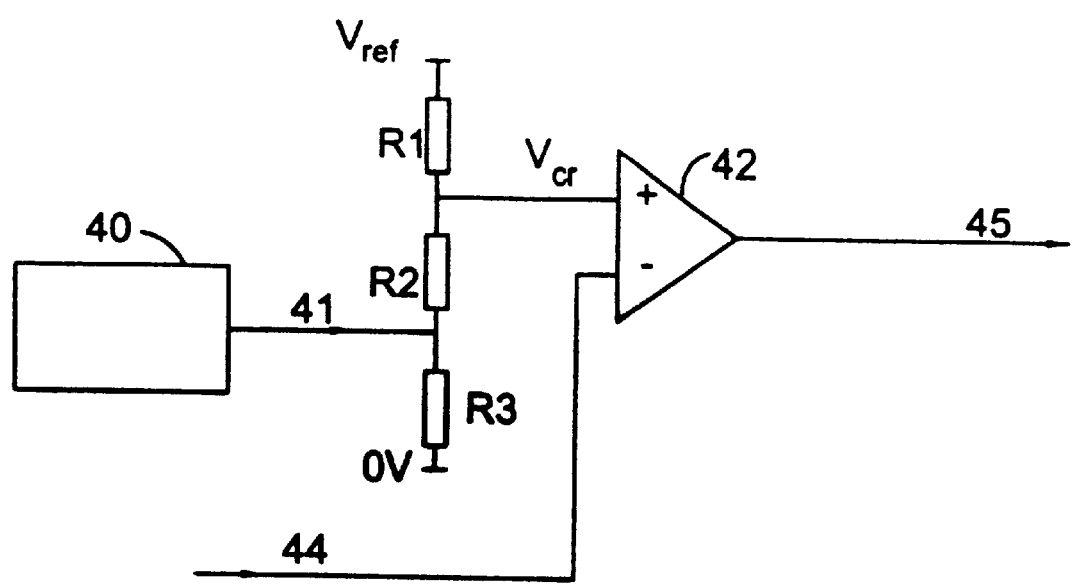
FIG. 6 shows a comparator circuit that may be used in an apparatus in which the invention is embodied.

FIG. 6 shows part of a control system for a switched reluctance drive which includes a microprocessor 40 and which could be included in the controller 14 of FIG. 2. One output 41 of the microprocessor is connected to a chain of resistors R1, R2 and R3 that act as voltage dividers for a reference voltage Vref. Signal Vcr from the junction of R1 and R2 is supplied to comparator 42 to represent a desired current reference. The second input to the comparator 42 is a current feedback signal 44 representative of the current in the phase winding of the motor. Signal 44 may be taken from a current transducer as shown in FIG. 2 or may be produced by an algorithm that predicts or deduces the phase winding current. The output 45 of the comparator 42 is used to control the firing of the switches in the power converter 13 of FIG. 2. This is done in the conventional way, i.e. when the phase winding current rises above the level corresponding to current reference $V_{cr}$, the comparator disables the switching of the power converter until the current falls below the required level. The cycle then repeats for as long as it is required to energize that phase winding.

When the drive is started, the microprocessor detects that the speed is at or near zero and is programmed to make the output 41 at or near zero volts. This shorts out R3 and reduces $V_{cr}$, causing the drive to start with a low current reference and hence a reduced level of torque. As the speed of the drive increases, it reaches a predetermined threshold at which the microprocessor sets the output 41 to a high impedance. The junction of R2 and R3 is no longer held at zero volts and rises to a steady-state value determined only by $V_{ref}$ and R1, R2 and R3. $V_{cr}$ then rises to a level suitable for steady-state running at the required levels of current and torque.

This method provides a simple and cost-effective implementation of the invention where the appliance in which the drive is installed is able to cope with the step in torque associated with the sudden change in current reference level at the changeover point.

A simple modification to this technique is to include a capacitor connected across, say, R2, or R2 and R3. As will be apparent to one skilled in the art, this will have the effect of turning the step in current demand into a ramp, thus softening the abrupt transition between the two levels of current demand.

It is important to realize that, in all the embodiments described, the current demand, and hence the developed torque, varies as a function of rotor speed and is not a timed function. Thus, if for any reason the load on the fan varies, e.g. because of dust build-up in a filter or suction orifice, and the time taken to reach a particular speed varies, the system will still operate correctly. In contrast, if the demand had been a function of time the performance of the system would have varied with varying load on the fan.

The skilled person will appreciate that variations of the disclosed arrangements are possible without departing from the invention. Although the specific description has been based on a cylinder type vacuum cleaner, it will be apparent that the invention can be applied equally to other types of vacuum cleaners and to floor cleaners and polishers. Accordingly, the above description of several embodiments is made by way of example and not for the purposes of limitation.

What is claimed is:

1. A floor cleaning apparatus comprising cleaning means, a switched reluctance drive having at least one phase winding and having a rotor for driving the cleaning means, a controller for controlling energization of the drive, the controller having means for determining the speed of the rotor and generating a rotor speed feedback signal, wherein during start-up of the apparatus, the controller is operable to vary the energization of the at least one phase winding of the drive from a first starting value to a second higher value as a function of the rotor speed feedback signal, thereby to reduce reaction torque produced by the drive during start-uo, the energization of the at least one phase winding of the drive depending on a level of current demanded in the at least one phase winding.

2. A floor cleaning apparatus as claimed in claim 1, wherein the controller is operable to vary the energization of the drive smoothly from the first value to the second value.

3. A floor cleaning apparatus as claimed in claim 2, wherein the controller is operable to vary the energization of the drive according to the following relationship:

$$E = a\omega^n + b$$

where E is the energization of the drive, $\omega$ is the rotor speed, a is an empirical constant, n is an index, and b is a constant representing the energization at zero speed.

4. A floor cleaning apparatus as claimed in claim 1, wherein the controller is operable to vary the energization in steps between the first value and the second value.

5. A floor cleaning apparatus as claimed in claim 4, wherein rotor speeds at which the energization is varied are stored in a look-up table.

6. A floor cleaning apparatus as claimed in claim 1, wherein the controller is operable to vary the energization from the first value to the second value in a single step.

7. A floor cleaning apparatus as claimed in claim 1, wherein the controller comprises a first resistor connected to a reference voltage, a second resistor connected to the first resistor, a third resistor connected to the second resistor and another voltage, a microprocessor connected between the second and third resistors and an output between the first and second resistors for supplying a control signal to the drive, the microprocessor being operable to set its output impedance to substantially zero when the apparatus is switched on and subsequently set its output impedance to a high value when the rotor speed reaches a predetermined value.

8. A floor cleaning apparatus as claimed in claim 1, whereby the controller varies the energization by varying a current demand signal.

9. A floor cleaning apparatus as claimed in claim 1, wherein the apparatus is a vacuum cleaner.

10. A floor cleaning apparatus as claimed in claim 9, wherein the cleaning means comprises a fan for creating suction and means, operably connected with the fan, for removing debris from a surface being cleaned.

11. A floor cleaning apparatus as claimed in claim 1, wherein the apparatus is a floor polisher.

12. A floor cleaning apparatus as claimed in claim 11, wherein the cleaning means comprises any of a polishing pad, a brush head and a mop head.

13. A method of operating a floor cleaning apparatus having cleaning means driven by a switched reluctance drive having at least one phase winding and having a rotor operably connected with the cleaning means, the method comprising:

energizing the drive at a first starting value when the apparatus is switched on, measuring the speed of the rotor, generating a rotor speed feedback signal, and varying the energization value of the at least one phase winding of the drive as a function of the rotor speed feedback signal thereby to reduce reaction torque produced by the drive during start-up, the energization value of the at least one phase winding of the drive depending on a level of current demanded in the at least one phase winding.

14. A method as claimed in claim 13, comprising varying the energization value smoothly as a function of the measured rotor speed.

15. A method as claimed in claim 14, wherein the energization value is varied according to the following relationship:

$$E = a\omega^n + b$$

where E is the energization value, ω is the rotor speed, a is an empirical constant, n is an index, and b is a constant representing the energization level at zero speed.

16. A method as claimed in claim 13 including increasing the energization value in one or more steps.

17. A method as claimed in claim 16 including reading from a look-up table that contains values of rotor speed at which the steps take place.

18. A method as claimed in claim 13, wherein the step of varying said energization value is dependent on a current demand signal.

19. A method as claimed in claim 13, wherein the apparatus is a vacuum cleaner.

20. A method as claimed in claim 13, wherein the apparatus is a floor polisher.

21. A floor cleaning apparatus comprising cleaning means, a switched reluctance drive having a rotor for driving the cleaning means, a controller for controlling energization of the drive, the controller having means for determining rotor speed of the drive, wherein when the apparatus is switched on initially the controller is operable to vary the energization of the drive as a function of the rotor speed from a first value to a second higher value, thereby to control the torque produced by the drive during start-up, wherein the controller is operable to vary the energization in steps between the first value and the second value, further wherein rotor speeds at which the energization is varied are stored in a look-up table.

22. A floor cleaning apparatus comprising cleaning means, a switched reluctance drive having a rotor for driving the cleaning means, a controller for controlling energization of the drive, the controller having means for determining rotor speed of the drive, wherein when the apparatus is switched on initially the controller is operable to vary the energization of the drive as a function of the rotor speed from a first value to a second higher value, thereby to control the torque produced by the drive during start-up, wherein the controller comprises a first resistor connected to a reference voltage, a second resistor connected to the first resistor, a third resistor connected to the second resistor and another voltage, a microprocessor connected between the second and third resistors and an output between the first and second resistors for supplying a control signal to the drive, the microprocessor being operable to set its output impedance to substantially zero when the apparatus is switched on and subsequently set its output impedance to a high value when the rotor speed reaches a predetermined value.

23. A method of operating a floor cleaning apparatus having cleaning means driven by a switched reluctance drive having a rotor operably connected with the cleaning means, the method comprising:

energizing the drive at a first level to drive the apparatus at a first speed when the apparatus is switched on, measuring the speed of the rotor, and varying the energization as a function of the measured rotor speed at which the apparatus is driven, increasing the energization level in one or more steps; and reading from a look-up table that contains values of rotor speed at which the steps take place.

* * * * *

UNITED STATES PATENT AND TRADEMARK OFFICE
CERTIFICATE OF CORRECTION

PATENT NO.   : 6,313,597 B1                          Page 1 of 1
DATED        : November 6, 2001
INVENTOR(S)  : Patricia M. Elliott, Howard J. Slater It is certified that error appears in the above-identified patent and that said Letters Patent is hereby corrected as shown below:

<u>Column 6,</u>
Line 51, "start-uo" has been changed to -- start-up --.

Signed and Sealed this

Twenty-sixth Day of March, 2002

Attest:

*Attesting Officer*

JAMES E. ROGAN
*Director of the United States Patent and Trademark Office*